United States Patent
Coluzzi et al.

(10) Patent No.: US 6,876,325 B1
(45) Date of Patent: Apr. 5, 2005

(54) SYSTEM AND METHOD FOR LOCATION-FINDING USING COMMUNICATION SIGNALS

(75) Inventors: Michael Eugene Coluzzi, Los Angeles, CA (US); Bernard Andrew Rees, Sherman Oaks, CA (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 0 days.

(21) Appl. No.: 10/814,651

(22) Filed: Apr. 1, 2004

(51) Int. Cl.[7] .................................................. G01S 1/08
(52) U.S. Cl. ................... 342/386; 342/357.06; 375/150
(58) Field of Search .......................... 342/189, 357.01, 342/357.06, 357.12, 464, 386; 375/149, 150; 370/206, 207

(56) References Cited

U.S. PATENT DOCUMENTS

| | | | |
|---|---|---|---|
| 4,626,861 A | 12/1986 | Wiley | |
| 4,910,526 A | 3/1990 | Donnangelo et al. | |
| 5,075,694 A | 12/1991 | Donnangelo et al. | |
| RE34,004 E | 7/1992 | Rogoff et al. | |
| 5,446,461 A | 8/1995 | Frazier | |
| 5,508,708 A | 4/1996 | Ghosh et al. | |
| 5,526,001 A | 6/1996 | Rose et al. | |
| 5,615,175 A | 3/1997 | Carter et al. | |
| 5,659,520 A | 8/1997 | Watson et al. | |
| 5,729,570 A * | 3/1998 | Magill | 375/149 |
| 5,920,278 A | 7/1999 | Tyler et al. | |
| 5,999,116 A | 12/1999 | Evers | |
| 6,094,169 A | 7/2000 | Smith et al. | |
| 6,211,811 B1 | 4/2001 | Evers | |
| 6,236,365 B1 | 5/2001 | LeBlanc et al. | |
| 6,249,252 B1 | 6/2001 | Dupray | |
| 6,378,801 B1 | 4/2002 | Pell et al. | |
| 6,512,478 B1 | 1/2003 | Chien | |
| 6,522,296 B2 | 2/2003 | Holt | |
| 6,536,553 B1 | 3/2003 | Scanlon | |
| 6,615,155 B2 | 9/2003 | Gilboa | |
| 2001/0022558 A1 | 9/2001 | Karr, Jr. et al. | |
| 2001/0055330 A1 * | 12/2001 | Goodings | 375/150 |
| 2002/0080862 A1 * | 6/2002 | Ali | 375/148 |
| 2002/0196186 A1 | 12/2002 | Holt | |
| 2002/0196187 A1 | 12/2002 | Holt | |
| 2002/0196188 A1 | 12/2002 | Holt | |
| 2002/0196327 A1 | 12/2002 | Rui et al. | |
| 2003/0008265 A1 | 1/2003 | Hulet | |
| 2003/0043073 A1 | 3/2003 | Gray et al. | |
| 2003/0048224 A1 | 3/2003 | Benner et al. | |
| 2003/0052821 A1 | 3/2003 | Holt | |
| 2003/0085840 A1 | 5/2003 | Benner et al. | |
| 2004/0078142 A1 * | 4/2004 | Fuchs et al. | 701/213 |

OTHER PUBLICATIONS

Y. T. Chan et al., A Simple and Efficient Estimator for Hyperbolic Location, IEEE Transactions on Signal Processing, vol. 42, No. 8, Aug. 1994, 1905–1915.

* cited by examiner

Primary Examiner—Dao Phan
(74) Attorney, Agent, or Firm—Hunton & Williams LLP

(57) ABSTRACT

A method and system for location-determination of a mobile comprising of a receiver with a variable processor gain of up to 45.15 dB for detecting signals transmitted from transmitters that at a farther distance as well as from transmitters that are situated in sparsely populated areas. The system also includes a plurality of terrestrially deployed transmitters known as "pseudolites" that broadcast GPS-like signals, and in addition implementing the use of existing, available information from modulated signals, such as phase, amplitude and convolution with pseudorandom codes.

10 Claims, 4 Drawing Sheets

US 6,876,325 B1

SYSTEM AND METHOD FOR LOCATION-FINDING USING COMMUNICATION SIGNALS

CROSS REFERENCE TO RELATED APPLICATIONS

This application is related to co-pending application titled, "System And Method For Inverse Multilateration," U.S. application Ser. No. 10/814,650 filed concurrently herewith.

FIELD OF THE INVENTION

A system and method for determining location by using modulated signals, including code division multiple access (CDMA) and time division multiple access (TDMA) wireless communication signals, to complement or replace global positioning system (GPS) signals is disclosed.

BACKGROUND OF THE INVENTION

The ability to accurately determine one's location has long been a sought after goal. To that end, location determining systems have been developed. For example, GPS and other systems can be used to determine location.

One drawback associated with GPS is that, in some locations, reception of the required satellite signals is poor. Furthermore, GPS requires relatively expensive satellites and precision timing (usually with atomic clocks).

Other drawbacks of GPS systems are that they can experience geometric dilution of precision (GDOP). For example, GDOP can arise from errors propagated through the satellite signal transmission and through round-off errors in calculation.

In addition, the process of searching for and acquiring GPS signals, reading the ephemeris data for a multiplicity of satellites and computing the location of the receiver from this data can be time consuming, often requiring several minutes. In many cases, this lengthy processing time may render the information unusable.

On the other hand, in existing cellular systems a mobile telephone's location within the cellular system can be estimated by measuring a the time difference of arrival (TDOA) of signals transmitted to or from the mobile unit. TDOA depends on a number of factors some of which include, the number of receiving locations, the number of diverse antennas at each cell site, the average distance from the transmitting unit to each of the receiving base stations, the average height of the receiving antennas, and the average antenna power gain in the direction of the transmitting unit. Some TDOA systems may require a large number of well-placed sensors in order to get a robust, enhanced accuracy measurement. Hence, there is a need for fast, relatively inexpensive, yet accurate method of determining the location of an object.

SUMMARY OF THE INVENTION

Some embodiments of the present invention utilize apparatus that comprises a stand-alone receiver capable of at least a 40–45.15 dB processing gain (based on the short code length of 32,768). In some embodiments, the receiver may receive and digest CDMA timing information, and use it in a GPS-like computation to determine the receiver location.

In another embodiment of the present invention, there is provided a system and method, based on CDMA cellular radio standard signals. The CDMA signals may be used to provide timing data to enable position computations.

For example, in some embodiments, each cell site may transmit a synchronous signal that is correlated with GPS signals (which typically has a Rubidium or other atomic standard clock backup). Because of such synchronization, a Pilot signal from each cellular base station can be demodulated and, thereby, yield an accurate time of arrival (TOA) for a signal to a receiver. When there are multiple base stations (e.g., three base stations), transmitting to a receiver then the position of the receiver can be determined by triangulation, multilateration or other position computation technique.

One advantage of some embodiments of the invention is that they can be implemented using the existing cellular infrastructure. Typically, this infrastructure includes thousands of transmitters across the United States and other countries, many of which contain battery backup power systems, and employ numerous support personnel. In addition, at least two separate entities exist that transmit their signals at different frequencies (800 MHz and 1.9 GHz). For at least these reasons, a formidable, robust and relatively inexpensive infrastructure exists to provide a backup or supplemental pseudo-GPS system in accordance with embodiments of the invention.

BRIEF DESCRIPTION OF THE DRAWINGS

The purpose and advantages of the present invention will be apparent to those of ordinary skill in the art from the following detailed description in conjunction with the appended drawings in which like reference characters are used to indicate like elements.

DETAILED DESCRIPTION OF THE DRAWINGS

The following description is intended to convey a thorough understanding of the invention by providing a number of specific embodiments and details involving the structure and operation of a novel apparatus. It should be understood, however, that the invention is not limited to these specific embodiments and details, which are provided for exemplary purposes only. It should be further understood that one possessing ordinary skill in the art, in light of known apparatuses and methods, would appreciate the use of the invention for its intended purposes and benefits in any number of alternative embodiments, depending upon specific design and other needs.

Figure 1:
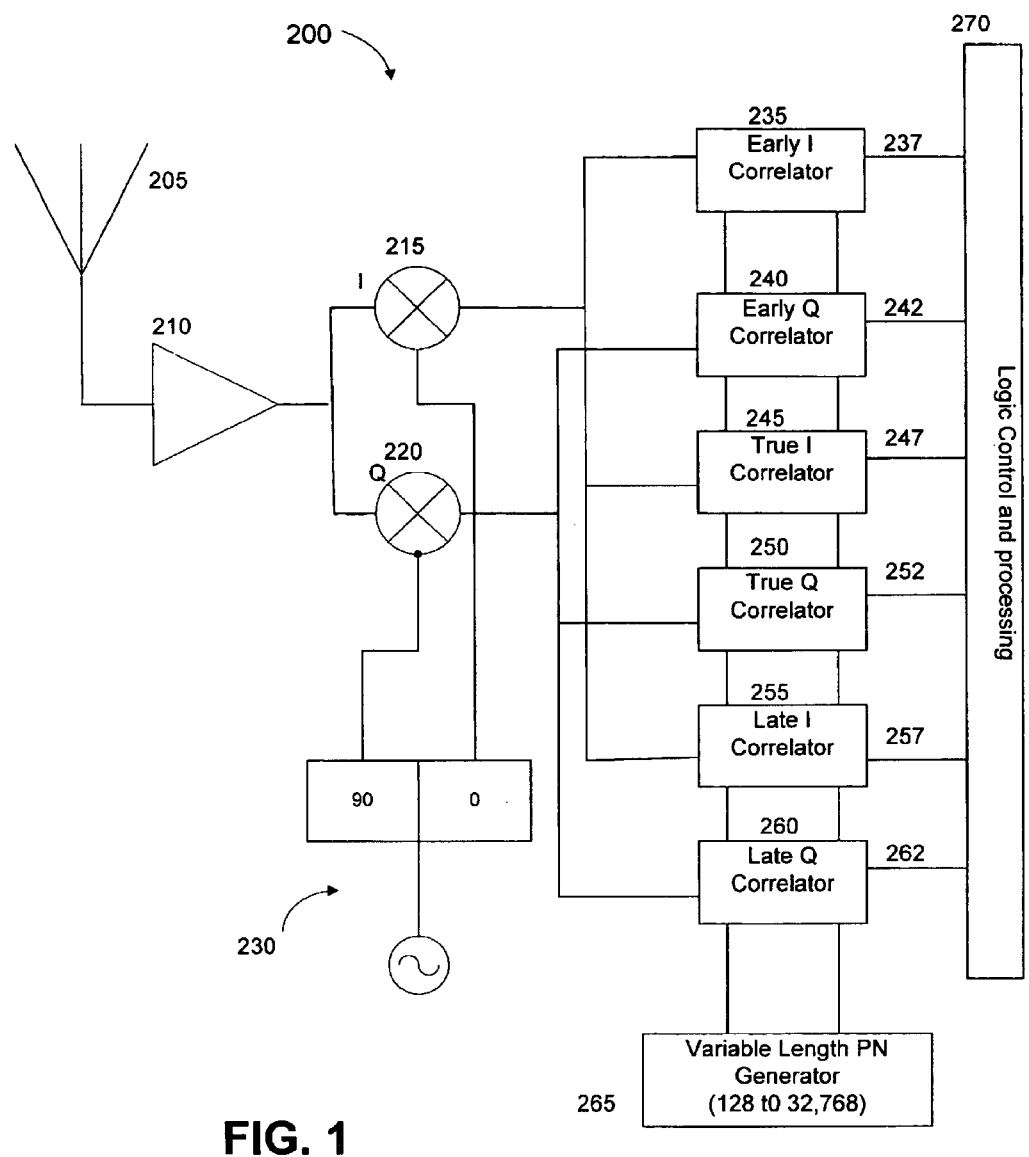
FIG. 1 is a schematic block diagram of a receiver according to embodiments of the invention.

FIG. 1, is an schematic illustration of a circuit for a receiver apparatus of 200 in accordance with some embodiments of the invention. Receiver 200 may receive a signal (e.g., a CDMA pilot pseudo noise (PN) signal) from a transmitter via antenna 205. The signal may be amplified (e.g., using a low noise amplifier 210). Receiver 200 may also include in-phase mixer 215, quadrature mixer 220 and an oscillator circuit 230 for down converting the CDMA signal from the CDMA frequency to a lower frequency and then digitizing the lower frequency GPS signal into an in-phase I and quadrature phase Q digital signals. Receiver 200 may also include a variable length pseudorandom generator 265 to generate a code of suitable length. For example, some embodiments may generate a code length of 128–32,768 bits.

The in-phase portion (I) of the signal may be fed into a early 235, true 245, and late 255 correlators. Similarly, the quadrature phase (Q) portion of the signal may be fed into an early 240, true 250, and late 260 correlators.

In some embodiments, a stored reference of the variable length generator may be defined by the pilot PN sequence based on the following characteristic polynomials:

$$PI(x)=x^{15}+x^{13}+x^9+x^8+x^7+x^5+1$$

(for the in-phase (I) sequence)
and $$PQ(x)=x^{15}+x^{12}+x^{11}+x^{10}+x^6+x^5+x^4+x^3+1$$

(for the quadrature (Q) phase sequence).

These orthogonal codes are taken from the any suitable specifications (e.g., the IS-95 specification) and can be modified for other communication system in the future.

The outputs 237, 242, 247, 252, 257 and 262 are passed onto a logic control and processing block 270, in order for the signal to be processed.

In some embodiments, an increase in accuracy, may be obtained by oversampling the base band signals by a factor of 100 (e.g., 122.55 MHz). Doing so may increase the precision of the systems measurement of time of arrival of such signals to approximately 2.44 meters (e.g., as determined from $(3\times10^8$ meters/sec)/(122.55 MHz). The amount of oversampling may be increased as the speed of available digital electronic circuits increases. Increased oversampling may be implemented to obtain greater precision in determining the location of the receiver.

Precision of the location determination may also be increased by other mechanisms. For example, precision will also increase as the chip frequency increases. It is anticipated that the WCDMA system planned for implementation in Europe within the next five years will have a chip rate of 3.84 MHz and the IS-2000 system which is in use today in the United States has provisions for a chip rate of at least 3.6864 MHz.

In some embodiments, it may be desirable to determine accurate locations for the antennas transmitting the timing signals (in CDMA the transmission antennas may be differentiated by assigned PN offsets). In general, this determination may be accomplished by obtaining a sample of transmitting antennas in a given survey area (e.g., about 10 antennas for every 1000 square miles) and then utilize location data (e.g., as provided by GPS) along with data collected from a suitable receiver (e.g., receiver 200) to determine transmitting antenna locations.

Figure 2:
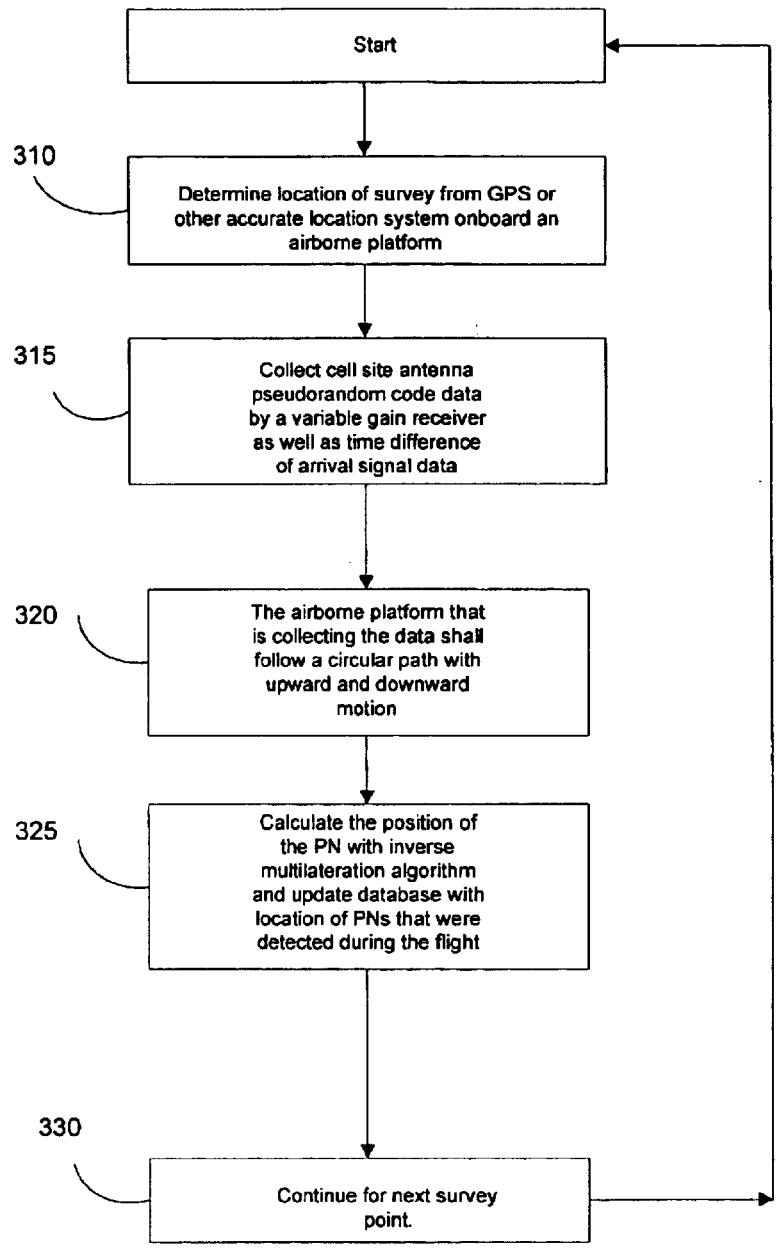
FIG. 2 is a flow chart of a receiver location technique according to embodiments of the invention.

FIG. 2 is a flow diagram illustrating a method for determining transmitting antenna location for some embodiments of the invention. Determining the location of a transmitting antenna may begin, as indicated at 310, with a survey of the area for which the transmitting antennas are to be located. The survey may be accomplished in any suitable manner (e.g., satellite imaging, GPS data, aerial survey or some other suitable technique). A suitable variable gain receiver (e.g., receiver 200) may be used to detect PN offset correlated with each base station antenna in the survey area. Preferably, the location of the receiver (e.g., receiver 200) may be accurately determined (e.g., from TDOA data or GPS data or some other reasonably accurate location system) as indicated at 315.

In embodiments where the survey is being performed from an aerial platform, it may be preferable for the aerial platform to circle or otherwise traverse the region of interest. For example, the aerial platform may circle and change elevation as indicated at 320. This traversal of the region of interest is performed in order to obtain data on the exact position of the transmitting object. It is preferable to obtain position data for each relevant dimension, therefore, the mobile detection platform may traverse the x, y and z planes. In an airplane (or other aerial device) one way to accomplish this traversal is to fly the airplane up in a spiral motion. In embodiments with other types of mobile platforms (e.g., land based or water based) similar traversals may be performed to collect data on the relative position of the transmitting object in reference to the detecting platform on all relevant position dimensions (e.g., x, y, and z axes).

Once this data is collected, the position of the base station transmitting antenna may be determined with an appropriate calculation as indicated at 325. For example, an inverse multilateration calculation may be performed in some embodiments.

As indicated at 330, the process of locating base station antennas may continue as desired. In addition, the locations of base station antennas may preferably be stored in a database or other retrievable system to facilitate actual operation of the systems and methods described herein.

Figure 3:
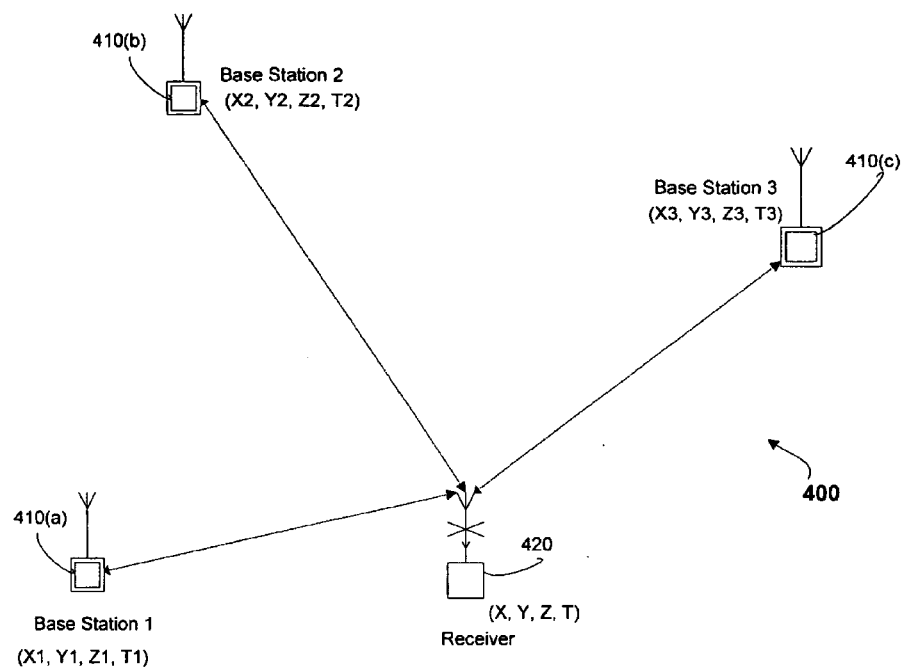
FIG. 3 is an illustration of a system and method to determine the location of a receiver according to embodiments of the invention.
Figure 4:
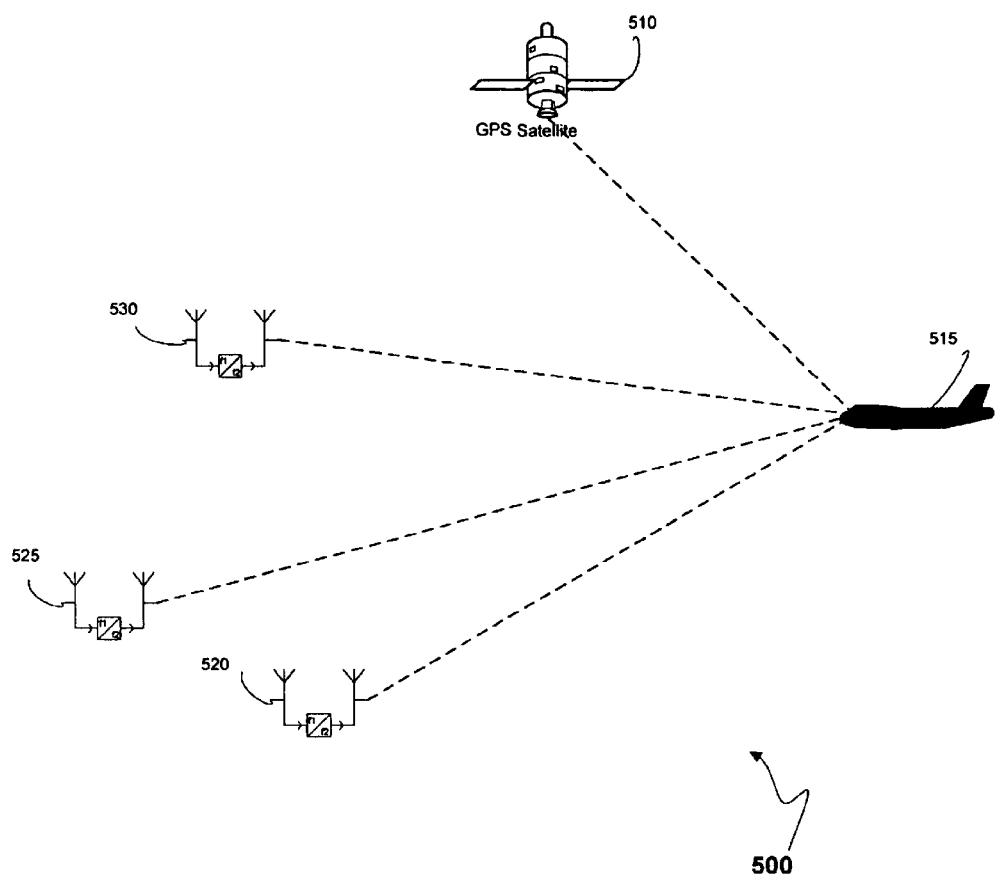
FIG. 4 is an illustration of a system for determining the location of an object in the absence of GPS satellites and in the event that a required number of cellular base stations are not available according to some embodiments of the invention.

In embodiments of the invention where the locations of base station antenna transmitters have been located (e.g., as described above in connection with FIG. 2) or are otherwise known, a variable gain receiver (e.g., receiver 200) may be used as a location determining device in the following manner. As shown in FIG. 3, system may comprise any number of modulated signal transmitter base stations (e.g., three base stations 410(*a*)–410(*c*) are shown in FIG. 4). The modulated signal may be transmitted in any suitable frequency range. For example, the base stations 410(*a*)–410(*c*) may be part of a CDMA or other cellular radio-frequency system.

A suitable receiver 420 (e.g., a variable gain receiver 200 with a suitable amount of gain as described in connection with FIG. 1) may be used to determine the location of the receiver within the system 400. The receiver 420 may comprise a hand-held device, a vehicle, aircraft or watercraft mounted device, and may be integrated into another device (e.g., a cellular phone, laptop or palm top computer, or the like).

During operation of some embodiments, the modulated signals (e.g., CDMA cellular radio standard signals) are used to provide data, part of which is an accurate timing signal, that, together with the known base station locations, can be used to determine receiver 420 location. For example, each of base stations 410(*a*), 410(*b*) and 410(*c*) may broadcasts a pilot signal synchronized among the base stations. Receiver 420 demodulates each pilot signal, thereby triangulating the position of the receiver based on the time difference of arrival (TDOA) of the pilot signals from each base station and to determine the location of the receiver from the known locations of the base stations 410(*a*)–410(*c*). Techniques for determining receiver location, such as triangulation, TDOA, time of arrival (TOA), multilateration and the like are known and any suitable determination may be used in accordance with embodiments of the invention.

In some embodiments of the invention, the variable gain receiver (e.g., receiver 200) may be used as a backup or supplement to an existing location determining system. For example, another embodiment shown in reference to FIG. 4, illustrates a system for determining the location of an object in the absence of GPS satellites and in the event that a required number of cellular base stations are not available. System 500, may utilize CDMA signals in conjunction with ground-based transmitters known as pseudolites (or pseudo satellites) that broadcast GPS-like signals from terrestrial locations. An entity, such as an aircraft 515 (or a vehicle, watercraft, handheld receiver, etc.), typically employs a GPS satellite navigation system (e.g., including signals transmitted from GPS satellites 510 with only one satellite shown for ease of illustration) in order to determine its position coordinates. In the event of the loss of GPS signals due to the lack of line of sight or any other such factors, aircraft 515, which may comprise a variable gain receiver (e.g., receiver 200) receives signals from pseudolites 520, 525 and 530 that transmit GPS-like signals that may be utilized to determine the position of the aircraft 515. The timing reference for these pseudolites 520, 525 and 530 may be derived from the CDMA signal produced by cellular base stations located nearby (not shown). For example, GPS receiver 525 may be modified to consider the ground based pseudolites as satellites and different Gold (PN) codes may be assigned so that their transmissions would not interfere with the standard GPS satellite signals. Thus, the CDMA signal in conjunction with the pseudolite signals may be used to determine the location of the aircraft 515 (or other receiver).

The invention now being fully described, it will be apparent to one of ordinary skill in the art that many changes and modifications can be made thereto without departing from the spirit or scope of the invention as set forth herein. The foregoing describes some embodiments of the invention along with a number of possible alternatives. These embodiments, however, are merely for example and the invention is not restricted thereto. It will be recognized that various materials and modifications may be employed without departing from the invention described above, the scope of which is set forth in the following claims.

We claim:

1. A receiver for receiving code division multiple access (CDMA) signals and determining the location of the receiver at least in part from the CDMA signals, comprising:

an antenna for receiving transmitted CDMA signals;

a circuit for converting the frequency of the CDMA signals and digitizing the CDMA signals into in-phase and quadrature signals;

a variable length pseudorandom code generator to generate a pseudorandom code;

an early, late and true correlator to correlate the in-phase and quadrature signals with the pseudorandom code; and a processor to compute the location of the receiver.

2. The receiver of claim 1 wherein the pseudorandom code generator generates a code that is variable in length from 128 to 32,768 bits.

3. A method for locating an object utilizing CDMA and GPS signals comprising:

receiving a GPS signals from a GPS signal transmitter at a receiver;

receiving a CDMA signal at the receiver;

digitizing the CDMA signal into in-phase and quadrature components;

locally generating a variable pseudorandom code (PN);

correlating the in-phase and quadrature components with early, true and late correlators;

multiplying the generated variable PN code with the early, true and late correlator; and processing the product of the early, true and late correlator and the PN code to determine the receiver location.

4. The method of claim 3, wherein the length of the PN code is varied from 128 to 32,768 bits.

5. The method of claim 3, wherein the correlation is performed on the in-phase and quadrature components separately.

6. An apparatus for locating an object utilizing CDMA and GPS signals comprising:

a receiver for receiving a CDMA signal from a base station;

an antenna for receiving the CDMA signals;

an amplifier for amplifying the received signal;

a digitizer for digitizing the CDMA signal into in-phase and quadrature components;

a variable pseudo random code (PN) generator for locally generating a PN code;

a correlator for correlating the in-phase and quadrature components by early, true and late correlators;

a multiplier for multiplying the generated variable PN code with the early, true and late correlator; and a processor for processing the product of the early, true and late correlator and the PN code to determine the location of the receiver.

7. The apparatus of claim 6, wherein the length of the PN code is varied from 128 to 32,768 bits.

8. The apparatus of claim 6, wherein the correlator performs on the in-phase and quadrature components separately.

9. The apparatus of claim 6, wherein the receiver is a variable gain receiver.

10. The apparatus of claim 9, wherein the receiver gain varied to avoid saturation of the signal.

* * * * *